United States Patent [19]
Edwards

[11] Patent Number: 5,359,275
[45] Date of Patent: Oct. 25, 1994

[54] LOAD CURRENT FUNDAMENTAL FILTER WITH ONE CYCLE RESPONSE

[75] Inventor: Charles W. Edwards, Monroeville, Pa.

[73] Assignee: Electric Power Research Institute, Inc., Palo Alto, Calif.

[21] Appl. No.: 969,081

[22] Filed: Oct. 30, 1992

[51] Int. Cl.$^5$ ............................................. G05F 1/70
[52] U.S. Cl. ..................................... 323/207; 363/40; 363/98; 363/71; 307/105
[58] Field of Search ....................... 363/35, 37, 40, 41, 363/71, 97, 98; 323/205, 207, 208, 209, 210; 307/105; 318/790, 803, 805–810; H02M 1/12, 5/40; G05F 1/70

[56] References Cited

U.S. PATENT DOCUMENTS

| | | |
|---|---|---|
| 3,863,140 | 1/1975 | Easter et al. . |
| 4,063,144 | 12/1977 | Hucker et al. . |
| 4,410,935 | 10/1983 | Dang . |
| 4,460,834 | 7/1984 | Gottfried . |
| 4,473,756 | 9/1984 | Brigden et al. . |
| 4,564,767 | 1/1986 | Charych . |
| 4,651,265 | 3/1987 | Stacey et al. . |
| 4,686,375 | 8/1987 | Gottfried . |
| 4,713,745 | 12/1987 | Schauder . |
| 4,728,808 | 3/1988 | Bet-Esh et al. . |
| 4,800,326 | 1/1989 | Unsworth . |
| 4,811,236 | 3/1989 | Brennen et al. . |
| 4,812,779 | 3/1989 | Wagner . |
| 4,814,683 | 3/1989 | Okamoto et al. . |
| 4,827,150 | 5/1989 | Reynal . |
| 4,835,454 | 5/1989 | White . |
| 4,862,054 | 8/1989 | Schauder . |
| 4,876,460 | 10/1989 | Johnson . |
| 4,937,720 | 6/1990 | Kirchberg . |
| 4,943,783 | 7/1990 | Nojima . |
| 4,962,339 | 10/1990 | Schauder . |
| 4,962,976 | 10/1990 | Takahashi et al. . |
| 4,980,812 | 12/1990 | Johnson, Jr. et al. . |
| 4,994,956 | 2/1991 | Kirchberg et al. . |
| 4,996,462 | 2/1991 | Krummel . |
| 5,001,619 | 3/1991 | Nakajima et al. . |
| 5,016,157 | 5/1991 | Rozman et al. . |
| 5,038,092 | 8/1991 | Asano et al. . |
| 5,047,909 | 9/1991 | Hosoda . |
| 5,047,910 | 9/1991 | Levran et al. . |
| 5,047,914 | 9/1991 | Dhyanchand et al. . |
| 5,051,704 | 9/1991 | Chapman et al. . |
| 5,075,634 | 12/1991 | French . |
| 5,077,532 | 12/1991 | Obermann et al. . |

*Primary Examiner*—Emanuel T. Voeltz
*Attorney, Agent, or Firm*—Flehr, Hohbach, Test, Albritton & Herbert

[57] ABSTRACT

An apparatus and method of constructing a sinusoidal output signal corresponding to a predetermined harmonic component of a sinusoidal input signal is described. The input signal is multiplied by a specified harmonic component of cosine and sine reference signals to divide it into direct and quadrature signals. The direct and quadrature signals are proportional to the amplitude of the specified harmonic component of the reference signals at the specified phase. Each cycle of the direct and quadrature signals is sampled a number of times to form direct and quadrature signal segments. The direct and quadrature signal segments are respectively placed in direct and quadrature circular buffers. Each circular buffer includes a number of formerly sampled segments. Before adding a new segment, the oldest segment in the buffer is dropped. Direct and quadrature amplitude sums, corresponding to the sum of all sampled segments within the respective circular buffers, are maintained. The buffers act as an averaging or integrating filter for the segment amplitude values. The instantaneous direct and quadrature amplitude sums are respectively re-multiplied by the same specified harmonic component of the cosine and sine reference signals to produce in-phase direct and quadrature fundamental signal components. These signals are then added to form a vector sum constituting a one-cycle delayed output signal which corresponds, in phase and amplitude, to the specified harmonic component of the input signal.

13 Claims, 5 Drawing Sheets

LOAD CURRENT FUNDAMENTAL FILTER WITH ONE CYCLE RESPONSE

The present application is related to the following commonly assigned applications:

Active Power Line Conditioner with Synchronous Transformation Control, filed Oct. 30, 1992, Ser. No. 07/968,850;

Active Power Line Conditioner with Fundamental Negative Sequence Compensation, filed Oct. 30, 1992, Ser. No. 07/969,932;

Active Power Line Conditioner with Fast Dynamic Response, filed Oct. 30, 1992, Ser. No. 07/969,344;

Highly Fault Tolerant Active Power Line Conditioner, filed Oct. 30, 1992, Ser. No. 07/969,772;

Active Power Line Conditioner with Low Cost Surge Protection, filed Oct. 30, 1992, Ser. No. 07/969,137;

Harmonic Controller for an Active Power Line Conditioner, filed Oct. 30, 1992, Ser. No. 07/968,847; and Low Cost Active Power Line Conditioner, filed Mar. 12, 1993, Ser. No. 08/030,783.

BRIEF DESCRIPTION OF THE INVENTION

This invention relates generally to a method and apparatus for providing low distortion power signals. This invention more particularly relates to a one cycle response filter for deriving a feed-forward load current fundamental signal which is subtracted from an instantaneous load current signal to obtain a load current harmonic signal which is used as a reference signal by a parallel inverter of an active power line conditioner.

BACKGROUND OF THE INVENTION

Power electronic circuits are used to control and condition electric power. For instance, power electronic circuits may be used to convert a direct current into an alternating current, to change voltage or current magnitude, or to change the frequency of an alternating current.

An inverter is a power electronic circuit which receives a dc source signal and converts it into an ac output signal. Harmonic neutralization and pulse-width modulation techniques are used to generate the ac signal. Harmonic neutralization involves a combination of several phase-shifted square-wave inverters, each switching at the fundamental frequency. Pulse-width modulation involves switching a single inverter at a frequency many times higher than the fundamental.

Filters can be classified according to whether their main purpose is to improve the power waveform or to remove EMI. Filters for waveform improvement usually deal with frequencies in the audio range. EMI filters are usually concerned with frequencies of 455 kHz or higher.

Passive filters are typically used to eliminate undesirable harmonics from the inverter output. Unfortunately, passive filters do not provide continuous harmonic filtering on pulsating or randomly varying loads. This occurs because passive filters only adapt to new harmonic levels after a considerable settling delay.

Passive filters tend to be large, heavy, costly, and, in general, highly load-dependent. Consequently, passive filters frequently represent a substantial part of the total cost, weight, and size of power electronics equipment.

Active filters represent an emerging technology without many of the shortcomings associated with passive filters. The technology relies upon the theory of active-feedback filters. A feedback loop with a single energy-storage element (an inductor or capacitor) is used to minimize the difference between the actual waveform and the desired waveform.

The urgency of developing successful active power filters has recently grown in view of the increasing waveform distortion of both voltages and currents in ac power distribution systems. These distortions are largely attributable to a growing number of nonlinear loads in the electric utility power network. Typical nonlinear loads are computer controlled data processing equipment, numerical controlled machines, variable speed motor drives, robotics, medical and communication equipment.

Nonlinear loads draw square wave or pulse-like currents instead of purely sinusoidal currents drawn by conventional linear loads. As a result, nonlinear current flows through the predominantly inductive source impedance of the electric supply network. Consequently, a non-linear load causes load harmonics and reactive power to flow back into the power source. This results in unacceptable voltage harmonics and load interaction in the electric power distribution in spite of the existence of voltage regulators.

The degree of current or voltage distortion can be expressed in terms of the relative magnitudes of harmonics in the waveforms. Total Harmonic Distortion (THD) is one of the accepted standards for measuring voltage or current quality in the electric power industry.

Apart from voltage and current distortion, another related problem may arise when nonlinear loads are connected to the electric power network. In particular, when the load current contains large amounts of third or other triplen harmonics, the harmonic current tends to flow in the neutral conductor of the power system. Under these conditions, the neutral current can exceed the rated current of the neutral conductor. Since the neutral is normally designed to carry only a fraction of the line current, overheating or even electric fires can result.

As previously indicated, active filters may be used to alleviate these problems. Active filters, or active power line conditioners (APLCs) comprise one or two pulse width modulated inverters in a series, parallel, or series-parallel configuration. The inverters share a common dc link, which can be a dc inductor (current link) or a dc capacitor (voltage link). It is advantageous to keep the energy stored in the dc link (capacitor voltage or inductor current) at an essentially constant value. The voltage on the dc link capacitor can be regulated by injecting a small amount of real current into the dc link. The injected current covers the switching and conduction losses inside the APLC. The link voltage control can be performed by the parallel inverter.

Figure 1:
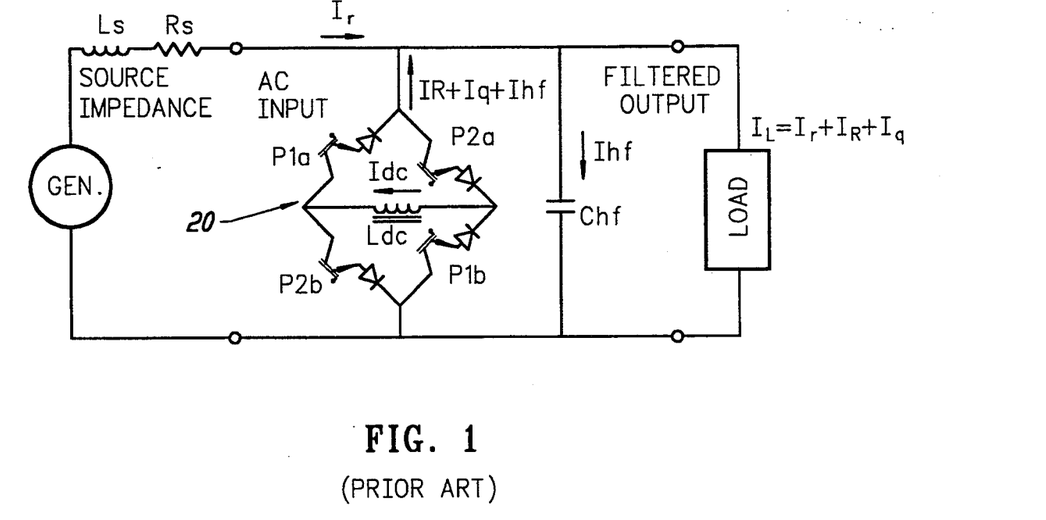
FIG. 1 is a parallel connected current source active filter in accordance with the prior art.
Figure 2:
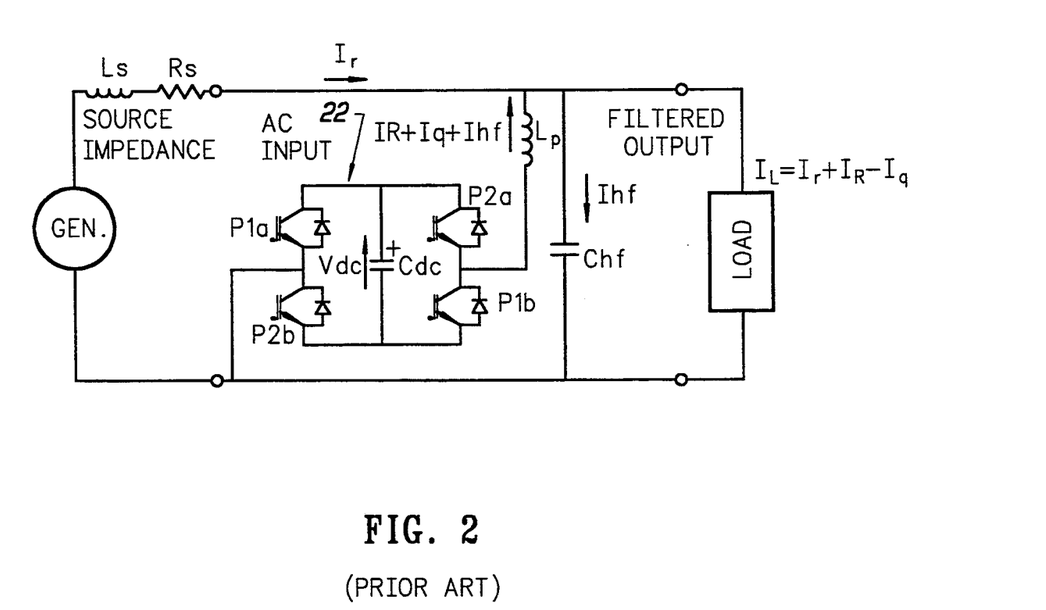
FIG. 2 is a parallel connected voltage source active filter in accordance with the prior art.

The basic active load current compensation with current or voltage source filters is known. FIG. 1 depicts a parallel connected current source active filter 20, and FIG. 2 depicts a parallel connected voltage source active filter 22. The load current $I_L$ consists of three components: The real current, $I_r$, the reactive current, $I_q$, and the ripple current, $I_R$. The parallel connected active filter supplies the $I_R$ and $I_q$ components, and, also, a small residual "high frequency" component $I_{hf}$, that flows into the parallel connected "high frequency"

capacitor $C_{hf}$. The parallel connected active filter is essentially a single phase inverter which is operated from an isolated current or voltage source.

The realization of the active filter requires solid state switches with intrinsic turn-off capability (transistors, IGBTs, MOSFETs, GTOs, etc.). Switch pairs P1 and P2 are alternately turned ON or OFF. The average voltage required in the link capacitor, $V_{dc}$, of FIG. 2, is supplied by the ac source. Real power can be absorbed by introducing an appropriate amount of offset in the symmetry of the on-times in switches P1 and P2. The polarity of the offset is coordinated with the polarity of the input voltage. When switches P1 of FIG. 2 are on, a current is generated between the tie inductor, Lp, the output capacitance dominated by $C_{hf}$, and the difference between the dc link and ac output voltages. Conversely, when the P2 switch pair is on, the current is driven by the sum of the dc link and ac output voltages.

The real power, necessary to maintain the selected dc link voltage magnitude, Vdc, is proportional to the average duty cycle of high-frequency pole switchings in any given half line voltage cycle. The isolated dc link voltage is regulated by a closed loop controller that affects the average pole switching symmetry. Reactive inverter currents can be produced that flow in or out of the inverter by temporary changes in the duty cycle of inverter pole switchings. The instantaneous magnitudes of inverter currents are regulated so that they provide the load compensation current requirements. For example, if a positive ripple current is detected, the on-time of P2 is increased with respect to P1. The increase results in the required net compensating ripple current flowing in the ac line. This also implies that the amplitude of Vdc must be kept higher than the highest value of the ac voltage across the load, otherwise, the instantaneous compensation capability of the active filter is impaired.

The rapid pulse width modulation switching in the active filter produces a high frequency, triangular shaped current, $I_{hf}$, an undesired side effect. The effect of the $I_{hf}$ signal is a small, superimposed triangular voltage ripple on the ac voltage. The amplitude of the voltage ripple is inversely proportional to the pole switching (carrier) frequency and the value of $C_{hf}$. The voltage ripple is filtered with a parallel capacitor $C_{hf}$.

When the active power filter (20 or 22) is connected across the load, a high degree of filtering of the terminal voltage is observed. Note that the active power filter is not capable of supplying or absorbing any real power other than that which is needed to compensate for losses inside the filter itself. It will, however, readily compensate reactive currents, non-synchronous and non-theoretical harmonics and sources with variable or unregulated frequency. The shunt connected power circuit is inherently protected under load short circuits since the load fault current bypasses the active power filter.

Figure 3:
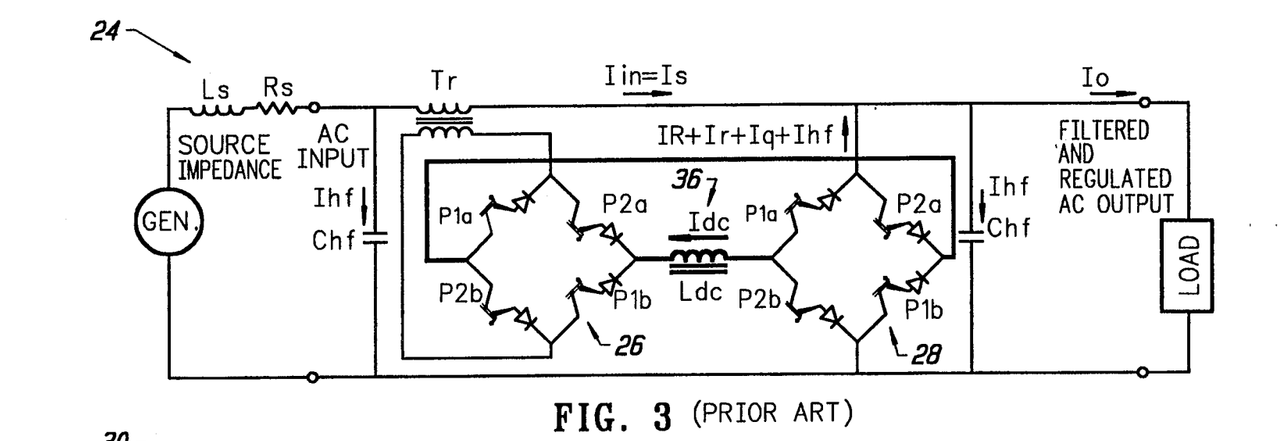
FIG. 3 is a shared link current source active power filter in accordance with the prior art.
Figure 4:
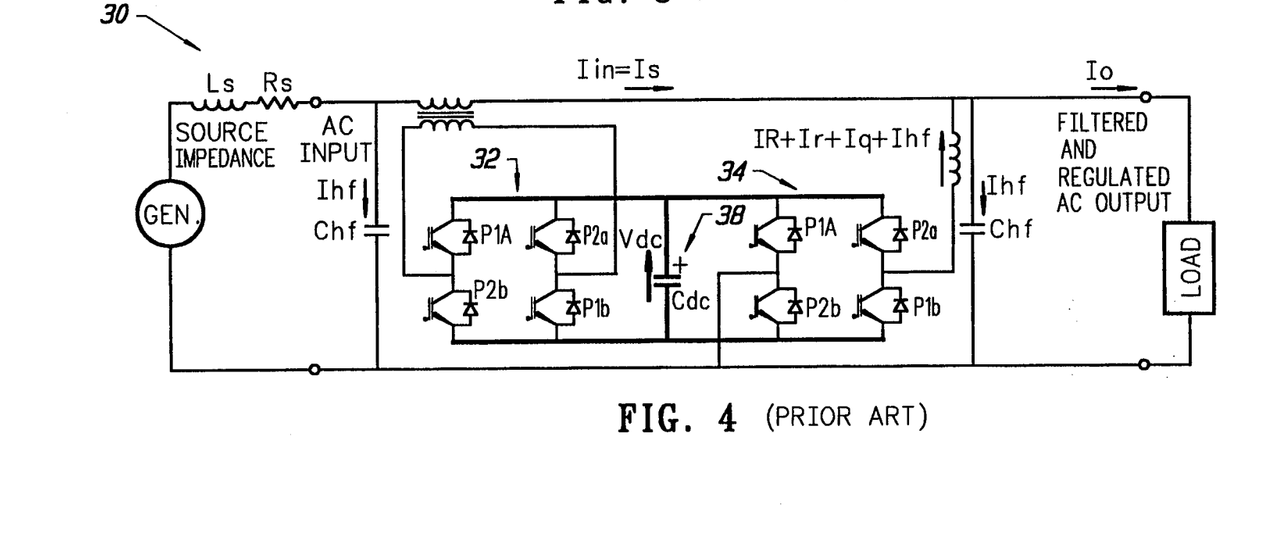
FIG. 4 is a shared link voltage source active power filter in accordance with the prior art.

The isolated dc link circuits of FIGS. 1 and 2 can be combined to produce an ac line conditioner and voltage regulator. FIG. 3 depicts a shared link current source active power filter 24 with a serial inverter 26 and a parallel inverter 28. FIG. 4 depicts a shared link voltage source active power filter 30, with a serial inverter 32, and a parallel inverter 34. The respective series and parallel inverters are similar to the filters described in relation to FIG. 1 and 2. The shared link approach of FIGS. 3 and 4 represents a combination of series and shunt connected filters which are operated from a common shared direct voltage (or current) source.

The shared link circuit topology removes the former limitation of the active power filter, namely, that it is not capable of supplying or absorbing any real power, apart from compensating for the losses in the active power filter itself. In the shared dc link series and parallel circuit topology, it becomes possible for both the series and the parallel filter element to absorb or generate real power at the fundamental frequency, or other frequencies, provided the total power absorbed equals the total power generated.

The series active elements (26 and 32) may be modulated to provide a fundamental voltage of controllable magnitude and phase so that the phase and magnitude of the ac output voltage stays sinusoidal at any required level and phase angle with respect to the ac input. The power required by the series element (26 or 32) is absorbed from or injected into the dc link (36 or 38). Link energy is then maintained by appropriately controlling the phase and magnitude of the fundamental modulating signal applied to the parallel connected element (28 or 34). The result is that the power needed by the series element (26 or 32) will be obtained from the parallel element (28 or 34). Similarly, power generated by the series element (26 or 32) will be returned into the ac output by the parallel element (28 or 34).

When the output and input voltages are not equal, the series inverter (26 or 32) delivers real power to or from the dc link (26 or 38). The amount of power exchange delivered with respect to the output power depends on the fundamental Vo/Vin ratio. When the Vo/Vin ratio is smaller than unity, the real part of the input current becomes larger than the output (load) real current. The difference between the output and input currents flows through both inverters via the dc link (36 or 38). Appropriate fast-acting controls insure that the power flow between the series and parallel inverters is kept equal on the average, so that the power flow does not significantly alter the stored energy in the shared dc link.

In addition to the regulation of the buck/boost power transfer, the parallel active element (28 or 34) is modulated at ripple frequency so that it provides a bypass for load generated ripple currents and, if required, for the reactive fundamental current of the load. After full compensation of ripple and reactive components, only real fundamental current is drawn from the ac input.

Thus, an important function of an active power line conditioner is to locally generate load ripple currents. A common way of generating load ripple currents is to derive the load current fundamental signal and then subtract it from the instantaneous load current, thereby rendering the load ripple currents.

In order to provide an active power line conditioner with fast transient response, the load current fundamental signal must be identified as soon as possible. Thus, it would be highly desirable to provide an active power line conditioner which can derive the fundamental component of the load current rapidly, namely, within one cycle. If the amplitude and phase of the processed fundamental signal is accurate enough, it can be subtracted from the total load current to obtain a good approximation of the harmonics which can be used as a feed-forward term for the parallel inverter.

Conventional filters such as band-pass filters can identify a given frequency component, but it is difficult for these devices to eliminate related unwanted frequency components, unless the circuit has an extremely high quality factor. Thus, it is desirable to provide a filter which clearly isolates a given frequency and eliminates related unwanted frequency components.

Even if an expensive high quality band-pass filter is used, the filter will require more than one cycle to settle. A low quality filter will ramp up to the correct amplitude in several cycles and a high quality filter will exhibit a transient overshoot. Thus, in view of the time constraints associated with prior art filters, it would be desirable to provide a load current fundamental filter with one cycle response.

A given frequency component may be successfully identified using Fourier Transform and Inverse Fourier Transform techniques on a selected component. The problem with this approach is that it is computationally intensive. Therefore, it would be desirable to provide a filtering technique which is not computationally intensive.

Another shortcoming associated with prior art filtering techniques is that it is very difficult to preserve the phase of the desired signal. Consequently, a phase-locked filtering apparatus for use in identifying a fundamental load current signal would be highly desirable.

OBJECTS AND SUMMARY OF THE INVENTION

It is a general object of the present invention to provide an improved active power line conditioner.

It is another object of the invention to provide a mechanism for controlling parallel filter output voltages to compensate for load current harmonics.

It is a more particular object of the invention to provide a filter which derives a load current fundamental signal which may be subsequently used as a feed-forward signal to be subtracted from an instantaneous load current signal to yield a load current harmonic signal.

It is a related object of the invention to provide a one cycle response load current fundamental filter.

It is another object of the invention to provide a load current fundamental signal filter which eliminates unwanted frequencies by reproducing only the signal of interest.

It is still another object of the invention to provide a load current fundamental signal filter which does not rely upon computationally intensive techniques.

It is another object of the invention to provide a load current fundamental signal filter with accurate phase reproduction capabilities, thereby acting as a type of phase-locking circuit.

These and other objects are obtained by the present invention which includes an apparatus and method of constructing a sinusoidal output signal corresponding to a predetermined harmonic component of a sinusoidal input signal. The input signal is multiplied by a specified harmonic component of cosine and sine reference signals to divide it into direct and quadrature signals. The direct and quadrature signals are proportional to the amplitude of the specified harmonic component of the reference signals at the specified phase. Each cycle of the direct and quadrature signals is sampled a number of times to form direct and quadrature signal segments. The direct and quadrature signal segments are respectively placed in direct and quadrature circular buffers. Each circular buffer includes a number of formerly sampled segments. Before adding a new segment, the oldest segment in the buffer is dropped. Direct and quadrature amplitude sums, corresponding to the sum of all sampled segments within the respective circular buffers, are maintained. The buffers act as an averaging or integrating filter for the segment amplitude values. The instantaneous direct and quadrature amplitude sums are respectively re-multiplied by the same specified harmonic component of the cosine and sine reference signals to produce in-phase direct and quadrature fundamental signal components. These signals are then added to form a vector sum constituting a one-cycle delayed output signal which corresponds, in phase and amplitude, to the specified harmonic component of the input signal.

BRIEF DESCRIPTION OF THE DRAWINGS

For a better understanding of the nature and objects of the invention, reference should be made to the following detailed description taken in conjunction with the accompanying drawings, in which.

Like reference numerals refer to corresponding parts throughout the several views of the drawings.

DETAILED DESCRIPTION OF THE INVENTION

Figure 5:
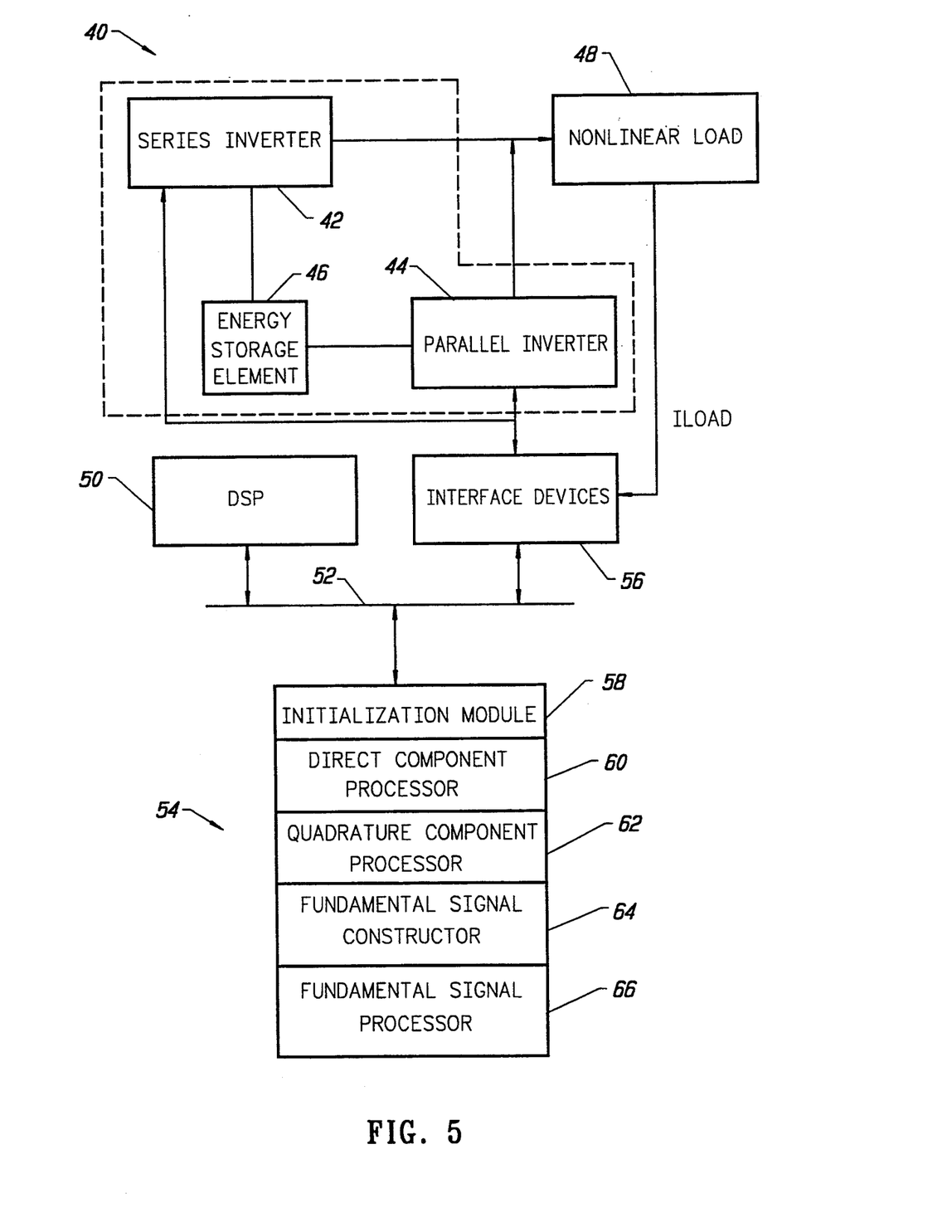
FIG. 5 depicts the digital and analog components associated with a preferred embodiment of the invention.

FIG. 5 depicts an active power line conditioner 40 which includes a series inverter 42 which is coupled to a parallel inverter 44 through an energy storage element 46, such as a dc link. The active power line conditioner 40 is used to condition power which is delivered to nonlinear load 48. In a preferred embodiment of the invention, digital circuitry is used to derive a feed-forward load current fundamental signal which may be subsequently processed and used as a reference signal for the parallel inverter 44.

In particular, the preferred embodiment of the invention includes a Digital Signal Processor (DSP) 50 which is coupled through a bus 52 to a memory unit 54, which may be any combination of RAM, ROM, or other memory medium. The DSP 50 is also coupled to interface devices 56. As used herein, interface devices 56 include analog-to-digital converters, digital-to-analog converters, pulse width modulators for the respective inverters, and may include keyboards, monitors, printers, and other equipment to provide an interface between a user of the digital equipment (DSP and Memory), and an interface between the digital equipment and the analog components (series inverter 42, energy storage element 46, parallel inverter 44).

The interaction between a DSP 50, a memory unit 54, and interface devices 56 is known in the art. The preferred embodiment of the present invention is directed toward execution of the program modules within the memory unit 54. In particular, as will be described below, DSP 50 executes a number of program modules including: an initialization module 58, a direct component processor 60, a quadrature component processor 62, a fundamental signal constructor 64, and a fundamental signal processor 66. In short, these modules process the load current signal ($I_{load}$) to determine the load current fundamental. Once the load current fundamental signal is identified, it can be subtracted from the instantaneous load current to derive a load current harmonic signal which can be applied as a reference signal through the interface devices 56 to the parallel inverter 44, thereby improving the quality of the voltage signals applied to the nonlinear load 48.

In accordance with the invention, the derivation of the load current fundamental signal can be realized in one cycle. The load current fundamental signal is multiplied by specified components of cosine and sine reference signals to divide it into direct and quadrature signals. The direct and quadrature signals are proportional to the amplitude of the specified components of the reference signals at the specified phase. Each cycle of the direct and quadrature signals is sampled a number of times to form direct and quadrature signal segments. The direct and quadrature signal segments are respectively placed in direct and quadrature circular buffers. Each circular buffer includes a number of formerly sampled segments. Before adding a new segment, the oldest segment in the buffer is dropped. Direct and quadrature amplitude values, corresponding to the sum of all sampled segments within the respective circular buffers, are maintained. The buffers act as an averaging or integrating filter for the segment amplitude values. The instantaneous direct and quadrature amplitude values are respectively remultiplied by the same specified components of the cosine and sine signals to produce in-phase direct and quadrature fundamental signal components. These signals are then added to form a vector sum constituting the one-cycle delay load current fundamental signal (with proper phase and amplitude).

These processing steps may be realized with the digital apparatus of FIG. 5. The individual processing components of the invention are disclosed in the form of pseudo code. The initialization module 58 serves to clear variables, and later increment variables. As suggested by the description in the previous paragraph, a number of constants and variables are associated with the method of the invention. First, the number of elements within the circular buffer must be defined. This number is equivalent to the sampling rate. As used herein, this constant will be defined as "k". The particular harmonic of interest must also be identified. That is, the invention may be used to reconstruct the fundamental load current signal or any harmonic within the load current. The individual harmonic value will be identified as "n".

A variable must also be defined for the instantaneous direct sampled segment of the load current signal. This variable is a "sliding" term in the sense that it repeatedly moves, or slides, through the circular buffer. The direct component is obtained by multiplying the load current by specified components of a cosine reference signal. Therefore, this variable will be defined as "cosine$_{13}$ sliding$_{13}$ window[i]". Through similar reasoning, the quadrature component variable will be defined as "sine$_{13}$ sliding_window[i]".

Variables for storing the direct and quadrature buffer sum amplitudes are also required. These variables will be respectively denominated "cosine_total" and "sine_total".

Thus, the foregoing variables are initialized through the initialization module 58. In particular, the initialization module may be formed as follows:

(a) for i: = 0 to k do
(b)    begin
(c)       cosine_sliding_window[i]: = 0;
(d)       sine_sliding_window[i]: = 0;
(e)    end
(f) cosine_total: = 0;
(g) sine_total: = 0;

The constant values may also be defined in the initialization module. The next component associated with the invention is the direct component processor 60, which may be defined in pseudo code as follows:

(h) cosine_total: = cosine_total −
              cosine_sliding_window[i]
(i) cosine_sliding_window[i]: =
              cos(2*π*n*i/k) *input_signal
(j) cosine_total: cosine_total +
              cosine_sliding_window[i]

As previously discussed, a circular buffer is maintained which includes a sum of former signal segment values. In order to enter the new signal segment value into the buffer, a former signal segment must be eliminated from the buffer. Line (h) of the foregoing code achieves this function.

The former value is then overwritten by an instantaneous signal value, as performed by line (i). In particular, the input_signal, or load current signal, is multiplied by a specified component of a cosine reference signal. The specified component of the cosine reference signal is identified by the harmonic term "n". In addition, the cosine value includes a fractional value corresponding to its position in the rotational buffer, as indicated by the "i/k" term. Recall, that the "i" term denotes the instantaneous position in the buffer, while the "k" term denotes the total buffer size.

The final line of the pseudo code, line (j), performs the task of updating the buffer sum value. In other words, the new instantaneous amplitude value is added to the buffer sum value (cosine_total).

The quadrature component processor 62 operates in an analogous manner, except a sine term is utilized. Thus, the quadrature component processor 62 may be characterized as follows:

(k) sine_total: = sine_total −
              sine_sliding_window[i]
(l) sine_sliding_window[i]: =
              sin(2*π*n*i/k) *input_signal
(m) sine_total: sine_total +
              sine_sliding_window[i]

The fundamental signal constructor 64 is invoked at this juncture. The fundamental signal constructor 64 is used to generate the output signal. The output signal may be generated by the following computation:

(n) output_signal := (cos(2*π*n*i/k) *cosine_total +
      sin(2*π*n*i/k) *sine_total)/k As the code indicates, the previously defined cosine_total, or amplitude term, is multiplied by specified components of a cosine reference signal. Thus, the instantaneous cosine reference signal, in proper phase, is being multiplied by an averaging or integrating buffer value, to provide a proper amplitude term. The same action is performed for the sine signal. The respective products are then added to form a vector sum. The sum of the products is then divided by the buffer size to provide an instantaneous signal corresponding to one sample value (a value corresponding to the "i" term of the buffer).

In sum, the frequency component of interest of the load current input signal is divided into direct and quadrature signals. Each cycle of the direct and quadrature signals is subjected to multiple sampling. The samples are summed and placed in a circular buffer. Subsequently, these values are updated as new signals are processed. The amplitude sum of the buffer values is used as an averaging term in subsequent processing. In particular, specified components of instantaneous cosine and sine signal segments are respectively multiplied by the cosine buffer and sine buffer sum values. Thus, the buffer values provide a proper amplitude value, while the reference signal provide a proper phase value for the load current signal.

In this way, the load current fundamental signal is efficiently derived, within one cycle, with minimal computing power. Note also that unwanted frequencies are clearly eliminated with the method of the invention.

Fundamental signal processor 66 then performs a simple operation on the derived load current fundamental signal:

(o) parallel_reference:= input_signal −
           output_signal

This code merely subtracts the derived load current fundamental signal from the input signal to render a harmonic ripple signal (parallel_reference) which is used as a reference signal for the parallel inverter 44.

Naturally, the foregoing code is re-executed for as long as a signal needs to be processed. However, prior to re-entering the code at line (h), it is necessary to perform some additional initialization tasks. In particular, the initialization module 58 preferably includes the following code:

i:=i+1                                                    (p)

i:=i mod k                                                (q)

The "i" term is incremented and then divided by the buffer size "k". As the "mod" command indicates, the "i" term will assume the remainder of this division. Consequently, a circular buffer is maintained.

The digital embodiment of the invention has been practiced by sampling an input signal every 69.4 microseconds and placing the sampled values within a 240 element buffer. The instantaneous cosine and sine signal values were obtained through a look-up table.

Figure 6:
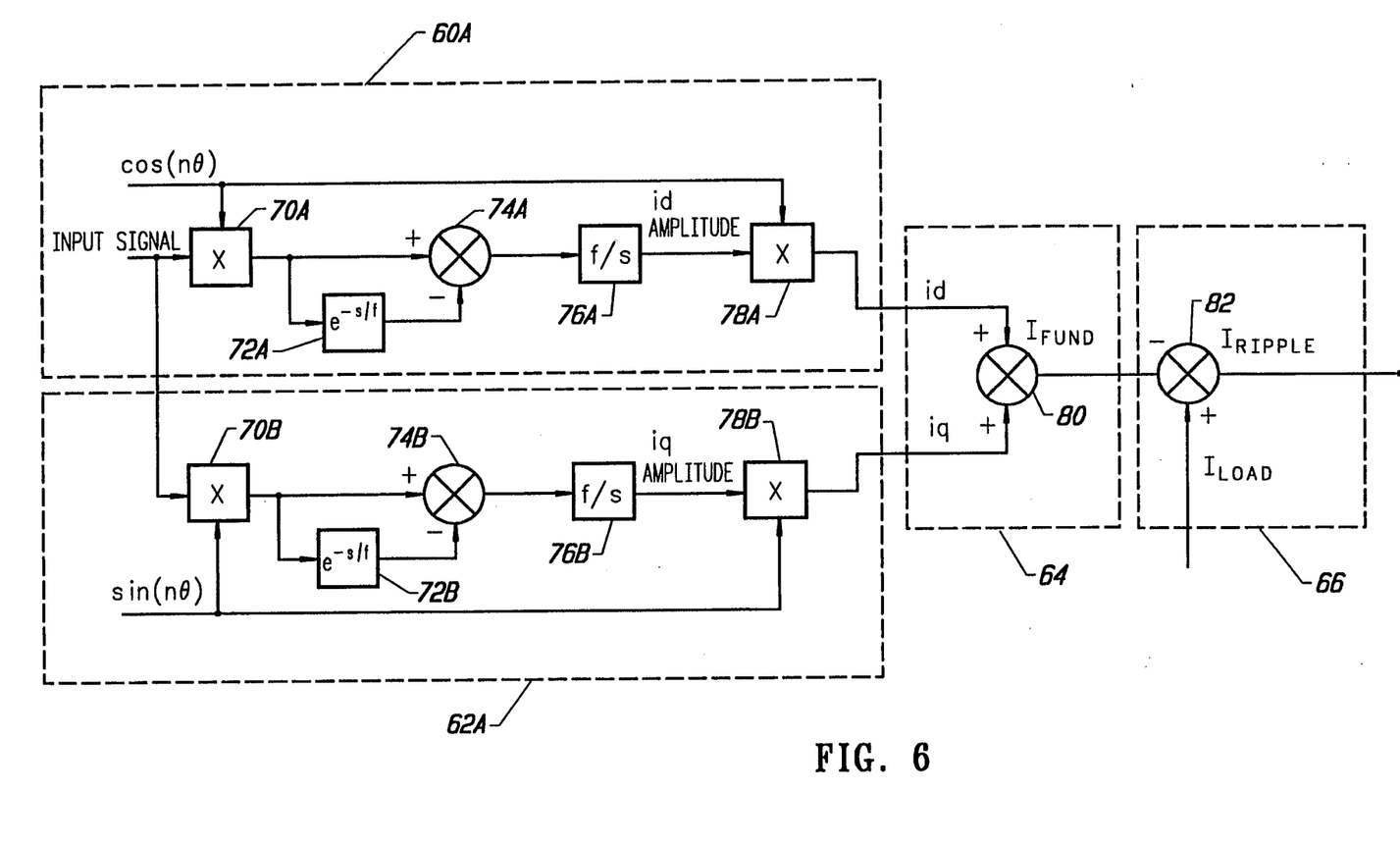
FIG. 6 depicts an analog embodiment of the digital components of the apparatus of FIG. 5.

The nature of the invention is more fully appreciated with reference to FIG. 6, which depicts an analog embodiment of the invention. The roughly equivalent digital elements are indicated in phantom.

The analog operation of the invention is as follows. The input signal is respectively multiplied by cosine and sine terms through multipliers 70. A one fundamental cycle delayed version of the output of each multiplier 70 is produced by phase-shift elements 72. The one fundamental cycle delayed signals are subtracted from the present value of the signal at adders 74. The outputs of adders 74 are respectively processed by integrators 76. The integrators 76 provide a smoothed or averaged output signal. The resultant signals are re-multiplied by the instantaneous cosine and sine signals through multipliers 78 to provide proper phase terms. The resultant products are summed by adder 80 to yield the load current fundamental signal, $I_{fund}$. The load current fundamental signal, $I_{fund}$, is subtracted at adder 82 from the instantaneous load current, $I_{load}$, to produce a load current ripple signal, $I_{ripple}$, which may be used by the parallel inverter 44.

Figure 7A:
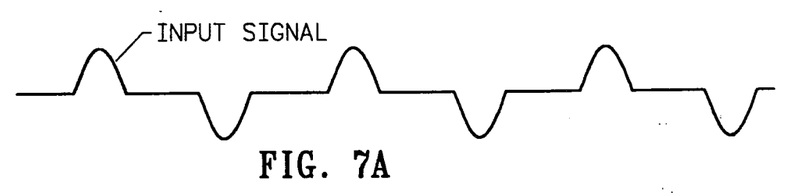
FIGS. 7A–7E depict the processing of a waveform in accordance with the present invention.
Figure 7B:
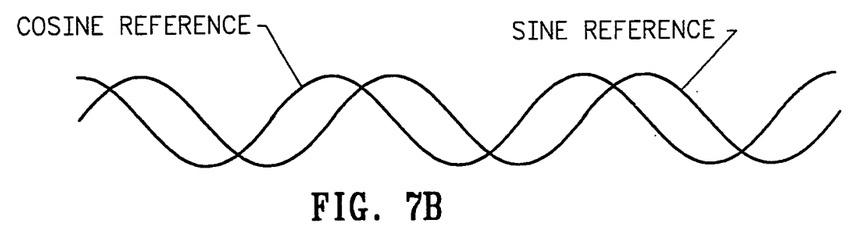
Figure 7C:
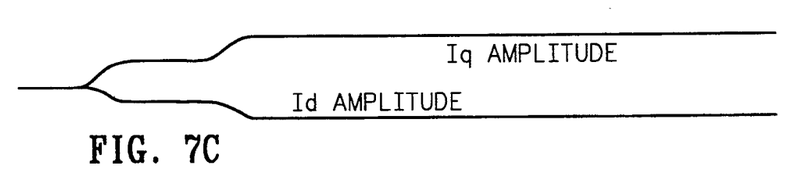
Figure 7D:
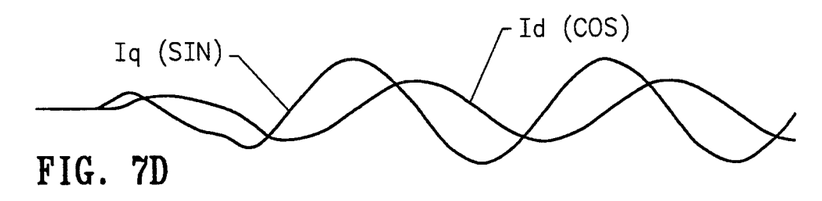
Figure 7E:
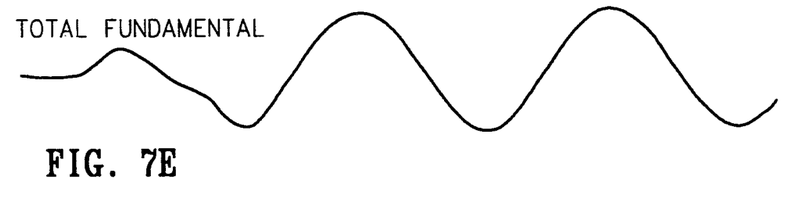

The signal processing of the invention is graphically depicted in relation to FIGS. 7A–7E. FIG. 7A depicts an input signal which is respectively multiplied by the cosine and sine reference signals of FIG. 7B. The waveforms of FIG. 7C represent the direct and quadrature signals respectively generated by the direct component processor 60 and quadrature component processor 62. The waveforms of FIG. 7D correspond to the output of multipliers 78A. The waveform of FIG. 7E is the sum of the waveforms of FIG. 7D; that is, it is the fundamental load current signal. (The waveforms of FIGS. 7C–7E are exaggerated for illustrative purposes).

The foregoing descriptions of specific embodiments of the present invention are presented for purposes of illustration and description. They are not intended to be exhaustive or to limit the invention to the precise forms disclosed, obviously many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated. It is intended that the scope of the invention be defined by the following claims and their equivalents.

I claim:

1. An apparatus to construct, within one cycle, a sinusoidal output signal corresponding to the fundamental component of a sinusoidal input signal, said apparatus comprising:

means for dividing said sinusoidal input signal into a direct component signal corresponding to said fundamental component and a quadrature component signal corresponding to said fundamental component;

first means for filtering said direct component signal with one or more former direct component signal values to construct a filtered direct component signal with an amplitude corresponding to said fundamental component amplitude;

second means for filtering said quadrature component signal with one or more former quadrature component signal values to construct a filtered quadrature component signal with an amplitude corresponding to said fundamental component amplitude;

first means for multiplying said filtered direct component signal by said fundamental component of a cosine reference signal to provide a modified filtered direct component signal with a phase value corresponding to said input signal;

second means for multiplying said filtered quadrature component signal by said fundamental component of a sine reference signal to provide a modified filtered quadrature component signal with a phase value corresponding to said input signal; and means for adding said modified filtered direct component signal and said modified filtered quadrature component signal to form said output signal corresponding to said fundamental component of said sinusoidal input signal.

2. The apparatus of claim 1 further comprising:

means for subtracting said output signal from an instantaneous load current output signal to render a load current harmonic ripple signal.

3. The apparatus of claim 2 further comprising:

means for conveying said load current harmonic ripple signal to a parallel inverter of an active power line conditioner.

4. The apparatus of claim 1 wherein said dividing means includes third means for multiplying said input signal by said fundamental component of a cosine reference signal to form said direct component signal; and forth means for multiplying said input signal by said fundamental component of a sine reference signal to form said quadrature component signal.

5. The apparatus of claim 1 wherein said first means for filtering includes means for deleting one of said former direct component signal values from a sum of said former direct component signal values;

means for adding said direct component signal to said sum of said former direct component signal values; and means for dividing said sum of said former direct components signal values by a direct component signal value count to render said filtered direct component signal.

6. A method of constructing, within one cycle, a sinusoidal output signal corresponding to the fundamental component of a sinusoidal input signal, said method comprising the steps of:

dividing said sinusoidal input signal into a direct component signal corresponding to said fundamental component and a quadrature component signal corresponding to said fundamental component;

filtering said direct component signal with one or more former direct component signal values to construct a filtered direct component signal with an amplitude corresponding to said predetermined harmonic component amplitude;

filtering said quadrature component signal with one or more former quadrature component signal values to construct a filtered quadrature component signal with an amplitude corresponding to said predetermined harmonic component amplitude;

multiplying said filtered direct component signal by said fundamental component of a cosine reference signal to provide a modified filtered direct component signal with a phase value corresponding to said input signal;

multiplying said filtered quadrature component signal by said fundamental component of a sine reference signal to provide a modified filtered quadrature component signal with a phase value corresponding to said input signal; and adding said modified filtered direct component signal and said modified filtered quadrature component signal to form said output signal corresponding to said fundamental component of said sinusoidal input signal.

7. The method of claim 6 further comprising the step of:

subtracting said output signal from an instantaneous load current output signal to render a load current harmonic ripple signal.

8. The method of claim 7 further comprising the step of:

conveying said load current harmonic ripple signal to a parallel inverter of an active power line conditioner.

9. The method of claim 6 wherein said dividing step includes the steps of:

multiplying said input signal by said fundamental component of a cosine reference signal to form said direct component signal; and multiplying said input signal by said fundamental component of a sine reference signal to form said quadrature component signal.

10. The method of claim 6 wherein said direct component filtering step includes the steps of:

deleting one of said former direct component signal values from a sum of said former direct component signal values;

adding said direct component signal to said sum of said former direct component signal values; and dividing said sum by a direct component signal value count to render said filtered direct component signal.

11. An apparatus to construct a sinusoidal output signal corresponding to fundamental component of a sinusoidal input signal, said apparatus comprising:

first means for multiplying said input signal by said fundamental component of a cosine reference signal to form a direct component signal;

second means for multiplying said input signal by said fundamental component of a sine reference signal to form a quadrature component signal;

first means for shifting said direct component signal to form a single cycle delayed direct component segment;

second means for shifting said quadrature component signal to form a single cycle delayed quadrature component segment;

first means for subtracting said single cycle delayed direct component segment from said direct component signal to form a single cycle delayed direct component signal;

second means for subtracting said single cycle delayed quadrature component segment from said quadrature component signal to form a single cycle delayed quadrature component signal;

first means for integrating said single cycle delayed direct component signal to form an integrated direct component signal;

second means for integrating said single cycle delayed quadrature component signal to form an integrated quadrature component signal;

third means for multiplying said integrated direct component signal by said fundamental component of a cosine reference signal to provide a modified integrated direct component signal with a phase value corresponding to said input signal;

fourth means for multiplying said integrated quadrature component signal by said fundamental component of a sine reference signal to provide a modified integrated quadrature component signal with a phase value corresponding to said input signal; and means for adding said modified integrated direct component signal and said modified integrated quadrature component signal to form said output signal corresponding to said fundamental component of said sinusoidal input signal.

12. The apparatus of claim 11 further comprising:

means for subtracting said output signal from an instantaneous load current output signal to render a load current harmonic ripple signal.

13. The apparatus of claim 12 further comprising:

means for conveying said load current harmonic ripple signal to a parallel inverter of an active power line conditioner.

* * * * *